G. R. GOERGENS.
MOTION PICTURE CAMERA.
APPLICATION FILED APR. 2, 1918.
1,299,323.
Patented Apr. 1, 1919.
2 SHEETS—SHEET 1.
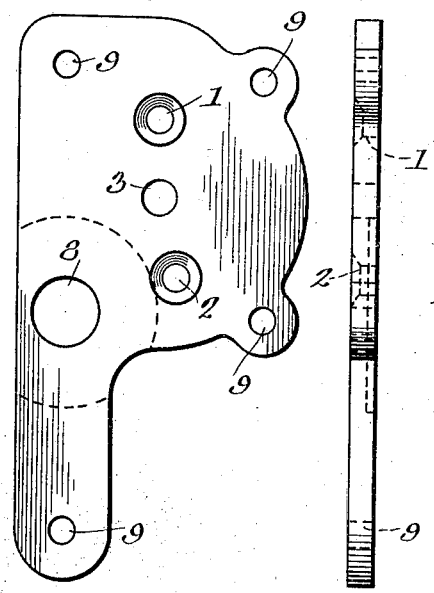
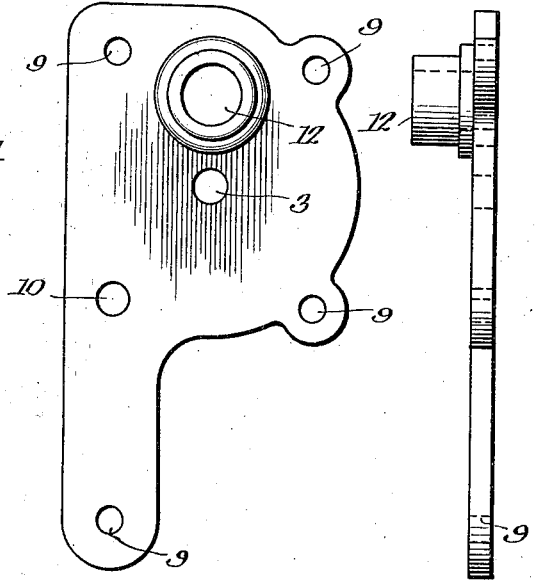
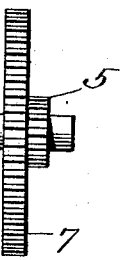
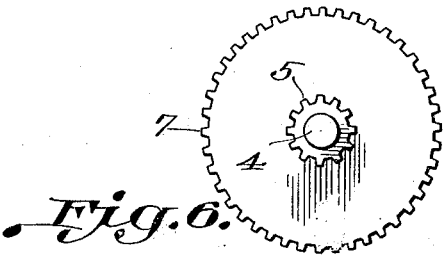
Inventor,
George R. Goergens

G. R. GOERGENS.
MOTION PICTURE CAMERA.
APPLICATION FILED APR. 2, 1918.

1,299,323.

Patented Apr. 1, 1919.
2 SHEETS—SHEET 2.

Inventor;
George R. Goergens

UNITED STATES PATENT OFFICE.

GEORGE R. GOERGENS, OF WASHINGTON, DISTRICT OF COLUMBIA.

MOTION-PICTURE CAMERA.

1,299,323.  Specification of Letters Patent.  Patented Apr. 1, 1919.

Application filed April 2, 1918. Serial No. 226,338.

(FILED UNDER THE ACT OF MARCH 3, 1883, 22 STAT. L., 625.)

*To all whom it may concern:*

Be it known that I, GEORGE R. GOERGENS, a citizen of the United States of America, and an employee of the United States Department of Agriculture, residing at Washington, District of Columbia, (whose post-office address is the Department of Agriculture, Washington, District of Columbia), have invented a new and useful Improvement in Motion-Picture Cameras.

This application is made under the act of March 3, 1883, chapter 143 (22 Stat. 625), and the invention herein described and claimed, may be used by the Government of the United States, or any of its officers or employees, in the prosecution of work for the Government, or any person in the United States, without payment to me of any royalty thereon.

The object of my invention is to provide a speeding up mechanism for moving picture cameras that will permit a large number of pictures to be taken in a given interval of time. At the present time, motion picture cameras are adapted to take pictures at the rate of sixteen pictures a second. By the use of my invention on ordinary motion picture cameras, it is possible to take pictures at the rate of 128 a second, and it is also possible to take pictures at the ordinary speed, or any variable speed ranging between the two.

My invention consists of the addition of two gears, a pinion, and a front and back plate to a motion picture camera constructed in the usual way, as is set forth particularly in the accompanying drawing.

Figure 13:
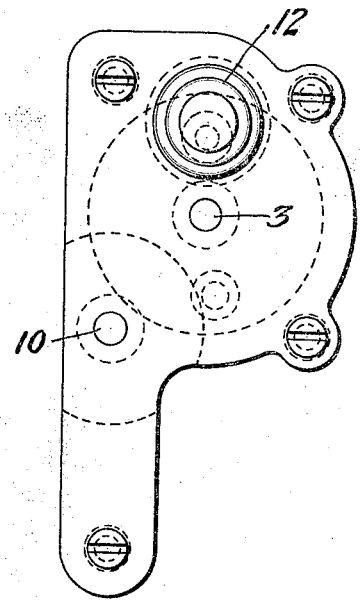
Figure 14:
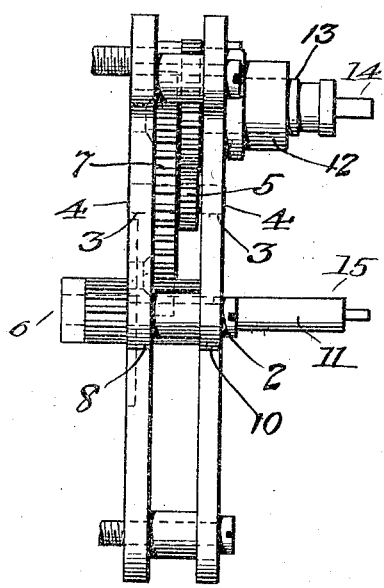
Figure 7:
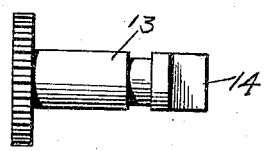
Figure 8:
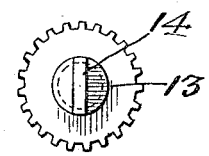
Figure 9:
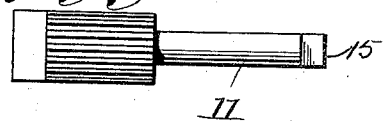
Figure 10:

Figure 1 of the accompanying drawing is a front view of the back plate, which is screwed to the side of the camera; Fig. 2 is an edge view of this back plate; Fig. 3 is a front view of the front plate which forms the outer covering for the gears; Fig. 4 is an edge view of this front plate; Fig. 5 is an edge view of the back gear; Fig. 6 is a front view of this back gear; Fig. 7 shows a side view of the center gear and handle shaft; Fig. 8 shows an end view of the same; Fig. 9 shows a side view of the pinion which passes through both plates; Fig. 10 shows an end view of the same; Fig. 11 shows one of the spacing collars which are placed between the front and back plates; Fig. 12 shows an end view of one of these spacing collars; Fig. 13 is a vertical section of the entire mechanism covered by my invention; Fig. 14 is a side view of this mechanism.

The mechanism is arranged in the following manner:

The back plate is fastened to the camera by two screws passed through openings 1 and 2; there is a circular opening 3 in each plate to permit the reception of the axle ends 4 of the back gear, Fig. 5; the center gear, Fig. 7, is placed against the back gear, Fig. 5, in such a way so as to mesh with the teeth of the small section 5 of the back gear; the pinion, Fig. 9, is placed in position to engage the shaft of the camera at 6; it also engages the teeth 7 of the large sprocket of the back gear; this pinion passes through the opening 8 of the back plate and is adapted to have a bearing in the opening 10 of the front plate; four collars Fig. 11 are placed each adjacent to an opening 9 of the back plate; the front plate Fig. 3 is then placed in position and is held in position by four screws of suitable construction, which pass through the openings 9 on the front and back plates and also each through a spacing collar, Fig. 11; the opening 10 permits the handle shaft 11 of the pinion, Fig. 9, to pass through the front plate; the opening 12 permits the handle shaft 13 of the center gear, Fig. 7, to pass through the front plate; the shaft 14 for the handle shown in Fig. 14 operates the speed up mechanism of the camera which permits the taking of motion pictures at rates of speed as high as 128 pictures a second; the handle shaft 15 shown in Fig. 14 provides for the operation of the motion picture camera at the usual rate of speed which permits pictures to be taken at the rate of 16 a second.

Having thus described my invention, I claim:

In a motion picture camera, an attachment consisting of a back plate, two gears, one of which carries one small and one large gear member, a front plate, a pinion, and one large and one small handle shaft secured to the other gear and the pinion, respectively, said back plate being adapted to be secured to the side of the camera, said gears being inclosed within the gear case, comprising the front and the back plate and adapted to be secured to the side of the camera as aforesaid, said gears being adapted to operate said pinion, said front plate forming the outer covering for said two gears, said pinion passing through the front and back plates and adapted to engage the shaft of the camera mechanism and to engage the teeth of the said large gear member, the small handle shaft being adapted to operate the camera at normal speed, the large handle shaft being adapted to operate the camera at an increased speed, said attachment being adapted to take motion pictures at rates of speed as high as 128 pictures a second.

In testimony I affix my signature in the presence of two subscribing witnesses.

GEORGE R. GOERGENS.

Witnesses:
G. L. HOFFMAN,
A. J. DECKER.

Copies of this patent may be obtained for five cents each, by addressing the "Commissioner of Patents, Washington, D. C."